United States Patent Office 2,773,087
Patented Dec. 4, 1956

2,773,087

METHOD FOR THE PRODUCTION OF α-SUBSTITUTED ORGANIC CARBONYL COMPOUNDS

Gilbert Stork, Leonia, N. J.

No Drawing. Application September 3, 1954,
Serial No. 454,199

7 Claims. (Cl. 260—464)

The present invention relates to a novel method for the production of α-substituted organic carbonyl compounds.

More particularly, the present invention relates to the production of α-substituted carbonyl compounds, such as aldehydes and ketones, by the reaction of their respective enamines with a reactive α,β-unsaturated organic compound to form an α-carbon substitution product, followed by water decomposition to obtain the α-substituted carbonyl compound.

The α-substituted carbonyl compounds of the type produced in accordance with the novel reaction of the present invention are known useful compounds. Typical examples of compounds of this type are the α-substituted derivatives of cyclic ring compounds which contain a keto group. Thus, for example, 2-cyanoethyl-cyclohexanone, prepared in accordance with the new process may be transformed into the corresponding lactam in accordance, for example, with the method disclosed in U. S. Patent No. 2,221,369 by rearrangement of its oxime. The lactam of 2-cyanoethyl-cyclohexanone may be converted to useful amines by catalytic hydrogenation, as shown in Patent No. 2,181,140 for subsequent conversion into linear polyamides for polymeric materials, synthetic fibers, and the like. Or the lactams can be converted by direct polymerization into polyamides of the nylon type, this being one of the industrially important ways of producing fibers, filaments and like objects. The lactams prepared from cyclohexanone, and its α-substitution products are important intermediates in the preparation of the soluble types of interpolymers which are useful in the manufacture of coated fabrics, films, wrapping materials and protective coatings for containers. Cyclohexanone and its α-substitution products are also of importance as reagents in the synthesis of steroids, wherein they perform the function of hydrogen acceptors in the Oppenauer oxidation of secondary steroidal alcohols. Accordingly there is made possible by the new method not only the simplified and more efficient preparation of many known compounds, but also a wide variety of new products.

According to known methods of synthesis, the introduction of substituents in the α position of carbonyl containing compounds requires a sequence of numerous steps, including, for example, the use of strong bases of the type of alkali metal amides and the like, or prior transformation of the carbonyl compound into a β-keto ester which must then be alkylated and decarboxylated. In addition, the strong bases used are likely to cause damage to sensitive groups either in the compound being treated or in the compound furnishing the α-substituent group. The direct method of the present invention uses no bases or catalysts, the reaction taking place merely by warming the enamine compound and the reagent in a suitable solvent followed by decomposition with water to regenerate the carbonyl compound.

There has therefore been provided in accordance with the present invention a novel process involving the direct reaction of enamines to form a carbon-to-carbon bond at the α position. There has further been provided a novel method by which only one substituent group is introduced at the α position of a carbonyl compound and especially the introduction of substituent groups at the α position of cyclic ring structures containing a keto group.

The method of the present invention may be carried out using a wide variety of carbonyl compounds, including open-chain and cyclic aldehydes and ketones. Examples of aldehydes and ketones into which a substituent group may be introduced at the α position by the method of the present invention include such substances as heptaldehyde, cyclopentanone, cyclohexanone, and cycloheptanone.

The preparation of the enamine condensation products of the aldehyde and ketone starting materials is carried out according to known methods. Any aldehyde or ketone which has a hydrogen atom on a carbon atom contiguous to the carbonyl group can be reacted with a secondary amine in a suitable solvent to form the enamine. The secondary amines used to prepare the enamines may be selected from a large variety of such compounds, but those are preferred which permit formation of the enamines by azeotropic distillation of the water formed in the condensation. For this purpose, pyrrolidine or ring-alkylated pyrrolidines have been found preferable in respect to yield and convenience of operation. However, other secondary amines, such as trimethyleneimine and piperidine may also be used.

The enamine condensation products are reacted with an α,β-unsaturated compound to yield α-carbon substitution products which are then decomposed with water to regenerate the carbonyl group, the net effect being to replace one α hydrogen of the original carbonyl compound with the substituent group. The α,β-unsaturated compounds used to furnish substituent groups may be of the type which are capable of being used in the Michael condensation, that is, they should contain attached to one ethylenoid carbon atom a strongly electron attracting group, e. g., carboxyl, nitrile, nitro. Such unsaturated compounds may include esters and nitriles of unsaturated acids, such as for example, acrylonitrile, acrylic or methacrylic esters such as methyl acrylate, as well as α,β-unsaturated aldehydes and ketones such as methyl vinyl ketone, acrolein, and the like.

In carrying out the process of the present invention, the crucial carbon-to-carbon bond forming step may be made to take place merely on warming the α,β-unsaturated compound together with the enamine in an inert solvent, the decomposition of the resulting product to the desired α-substitution product taking place simply on warming with water. In many cases, especially with ketones of suitable boiling points, it is unnecessary to isolate the condensation product of the ketone and the secondary amine, since this condensation may be effected, for example, by heating a mixture of ketone, amine and azeotrope solvent to bring about removal of water of condensation, with recovery of the solvent. The solvent may be used in the next step of the synthesis, or the latter may be conducted in a different solvent. Thus, it is unnecessary to isolate the substitution product before decomposition with water, and the entire transformation may be performed in a single operation. Any solvent which also acts as an azeotrope may be used to carry out the enamine condensation, but benzene has been found preferable for this purpose. As solvents for conducting the α-substitution reaction, there is a wide choice of those in which the enamine and the reagent are stable. Examples of solvents include alcohols such as methanol, ethanol and butanol, ethers such as glycol ethers, dioxane, tetrahydrofurane, and hydrocarbons such as benzene, toluene, and xylene.

The new method of the present invention makes possible the introduction of a single substituent group at the α position, in contrast with existing techniques which yield difficultly separable mixtures of polysubstituents. Thus, for example, the use of acrylonitrile for cyanoethylation of ketones generally yields poly-β-cyanoethylated cyclic ketones as pointed out in Patents 2,386,737 and 2,394,962. In accordance with the method of the present invention, in the cyanoethylation of cyclohexanone with acrylonitrile, over 80 percent yield of 2-cyanoethylcyclohexanone is obtained, essentially in one operation. The new method may also be applied directly to obtain monosubstitution products of aldehydes.

The following examples serve to illustrate, but are not intended to limit, the present invention:

Example I

A quantity of the enamine from cyclohexanone and pyrrolidine was prepared by refluxing these materials in the proportions of 2 g. of cyclohexanone to 6.6 ml. pyrrolidine in 35 ml. of benzene for half an hour, using a water separator to remove the water formed in the condensation, followed by removal of the benzene. 13.5 g. of this enamine was refluxed for 12 hours in 50 ml. of dioxane with 6 g. of acrylonitrile. Addition of 10 ml. of water, followed by heating for one hour, salting out and extraction with ether, gave 2-cyanoethyl cyclohexanone, boiling point 141–145°/10 mm. in over 80% yield. This was further characterized as its dinitrophenylhydrazone, melting point 155–156° (from methanol-chloroform).

Example II 10 g. of enamine from cyclohexanone was refluxed for three hours after being allowed to stand for 15 hours wth 11 g. of methyl acrylate. Addition of 5 ml. of water, refluxing an additional half an hour and working up as in Example I gave in over 70% yield the methyl ester of cyclohexanone-2-propionic acid, boiling point 134–137°/11 mm., further identified as its dinitrophenyl-hydroazone, melting point 93–94° (from methanol).

Example III

The enamine made from 2.24 g. of cycloheptanone and 6.6 ml. of pyrrolidine was refluxed in 50 ml. of benzene for 22 hours with 1.72 g. of acrylonitrile. Concentration to 10–15 ml., addition of 25 ml. of water and refluxing for 1 hour followed by the usual work up gave 2-cyanoethyl cycloheptanone, boiling point 140–145°, characterized by analysis, and by its semicarbazone, melting point 163–164° (from aqueous alcohol) and dinitrophenylhydrazone, melting point 114–116° (from alcohol-chloroform).

Example IV

An enamine was prepared from 5 g. of cyclopentanone and 4.5 g. of pyrrolidine in the usual way. 6 g. of the enamine was refluxed for 16 hours with 3 g. of acrylonitrile in 20 ml. of dioxane. Addition of 10 ml. of water and refluxing for 2 hours gave after the usual work up a good yield of 2-cyanoethyl cyclopentanone, boiling point 140–144°/13 mm.

Example V

The enamine from 2 g. of cyclohexanone and 6.6 ml. of pyrrolidine was heated with 1.5 g. of methyl vinyl ketone in 50 ml. of benzene for 19 hours. Addition of 25 ml. of water and refluxing for 1½ hours, followed by working up as usual gave in about 40% yield a mixture of the aldol derived from the expected 2-ketobutyl cyclohexanone together with its dehydration product $\Delta^{1,9}$-2-octalone. The mixture was further characterized by conversion to the dinitrophenyl hydrazone of $\Delta^{1,9}$-2-octalone, melting point 171–171° (from alcohol-chloroform).

Example VI

An enamine was prepared from 20 g. of heptaldehyde by mixing with ice-cooling with 25 g. of pyrrolidine and 15 g. of anhydrous potassium carbonate. After half an hour in the ice bath, the solution was filtered and distilled giving the desired enamine, boiling point 115°/25 mm. 10 g. of the enamine was refluxed for 16 hours in 25 ml. of dioxane solution with 5 g. of acrylonitrile. Addition of 10 ml. of water, followed by heating for 2 hours and working up as usual gave a good yield of 2-cyanoethyl heptaldehyde, boiling point 140–148°/12–13 mm.

In all of the above specific examples, the temperatures indicated are given in degrees centigrade.

I claim:

1. A method for the preparation of an α-substituted organic carbonyl compound selected from the group consisting of aldehydes and ketones containing a hydrogen atom on a carbon atom contiguous to the carbonyl group which comprises condensing the organic carbonyl compound with a secondary amine to form an enamine, reacting the enamine with an α.β-unsaturated organic compound in an organic solvent to effect substitution in the α position, and decomposing the resulting α-substitution product with water.

2. A method for the preparation of an α-substituted ketone which comprises condensing a ketone containing a hydrogen atom on a carbon atom contiguous to the carbonyl group with a secondary amine to form an enamine, reacting the enamine with an α.β-unsaturated organic compound in an organic solvent to effect substitution in the α position, and decomposing the resulting α-substitution product with water.

3. A method for the preparation of α-substituted cyclic ring compounds containing a keto group which comprises condensing a saturated cyclic ring compound containing a keto group with a secondary amine to form an enamine, reacting the enamine with an α.β-unsaturated organic compound in an organic solvent to effect substitution in the α position, and decomposing the resulting α-substitution product with water.

4. A method for the preparation of 2-cyanoethylcyclohexanone which comprises forming the enamine of cyclohexanone and pyrrolidine, treating the enamine with acrylonitrile in an organic solvent, and decomposing the resulting α-substitution product with water.

5. The method of claim 1 in which the organic carbonyl compound is an aldehyde containing a hydrogen atom on a carbon atom contiguous to the carbonyl group.

6. The method of claim 1 in which the α.β-unsaturated organic compound is a member of the group consisting of nitriles and esters of unsaturated acids.

7. The method of claim 1 in which the α.β-unsaturated organic compound is a nitrile of an unsaturated acid.

References Cited in the file of this patent

UNITED STATES PATENTS

| | | |
|---|---|---|
| 2,045,574 | Adkins | June 30, 1936 |
| 2,386,737 | Bruson | Oct. 9, 1945 |
| 2,578,787 | Benneville | Dec. 18, 1951 |

OTHER REFERENCES

Herr et al.: J. A. C. S., vol. 75, 5927–5928 (1953).